(12) United States Patent
Jung et al.

(10) Patent No.: US 7,440,367 B2
(45) Date of Patent: Oct. 21, 2008

(54) LAND PRE-PIT DATA DETECTION APPARATUS AND METHOD THEREOF

(75) Inventors: Hong-young Jung, Suwon-si (KR); Ki-hoon Chua, Seoul (KR); Sang-hun Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 537 days.

(21) Appl. No.: 10/921,302

(22) Filed: Aug. 19, 2004

(65) Prior Publication Data

US 2005/0147005 A1 Jul. 7, 2005

(30) Foreign Application Priority Data

Aug. 20, 2003 (KR) ............... 10-2003-0057513

(51) Int. Cl.
*G11B 7/00* (2006.01)
(52) U.S. Cl. ................. 369/47.27; 369/44.41
(58) Field of Classification Search ............. 369/275.3, 369/47.27, 47.1, 124.01, 124.07, 47.26, 53.22, 369/44.41, 44.42, 44.13, 47.28, 112.12
See application file for complete search history.

(56) References Cited

U.S. PATENT DOCUMENTS

| | | | |
|---|---|---|---|
| 6,757,233 B2 * | 6/2004 | Akabane et al. | 369/59.17 |
| 6,785,207 B2 | 8/2004 | Nishimura et al. | |
| 6,956,800 B2 * | 10/2005 | Tanaka | 369/53.2 |
| 6,956,805 B2 * | 10/2005 | Mashimo | 369/59.17 |
| 2001/0026512 A1 | 10/2001 | Nishimura et al. | |

FOREIGN PATENT DOCUMENTS

| | | |
|---|---|---|
| CN | 1316729 | 10/2001 |
| JP | 2003-099937 | 4/2003 |
| KR | 2003-0024560 | 3/2003 |
| KR | 2003-0025824 | 3/2003 |

OTHER PUBLICATIONS

Chinese Office Action issued and dated Feb. 9, 2007 in corresponding Chinese Patent Application No. 2004100589864.

* cited by examiner

*Primary Examiner*—Nabil Z Hindi
(74) *Attorney, Agent, or Firm*—Staas & Halsey LLP

(57) ABSTRACT

An apparatus and method has a capable of precisely detecting Land Pre-Pit (LPP) data recorded on an optical medium loaded into an optical drive. The apparatus includes an LPP data detecting unit that detects LPP data, from which a wobble frequency is removed, from a signal reflected from the optical medium; a wobble signal detector that detects a wobble signal from the reflected signal; and an LPP data generator that generates the LPP data recorded on the optical medium, using the detected LPP data and the detected wobble signal.

15 Claims, 4 Drawing Sheets

WOBBLE SLICE LEVEL

LPP SLICE LEVEL

LAND PRE-PIT DATA DETECTION APPARATUS AND METHOD THEREOF

CROSS-REFERENCE TO RELATED APPLICATION

This application claims the benefit of Korean Patent Application No. 2003-57513, filed on Aug. 20, 2003 in the Korean Intellectual Property Office, the disclosure of which is incorporated herein in its entirety by reference.

BACKGROUND OF THE INVENTION

1. Field of the Invention

The present invention relates to an apparatus and method for detecting Land Pre-Pit (LPP) data recorded on an optical medium.

2. Description of the Related Art

Spiral tracks on which a wobble signal is recorded are formed on a recordable optical medium such as a DVD-R, a DVD-RAM, a DVD+RW, and a DVD-RW. In the case of the DVD-RAM, a user data area and a header area are included in both land tracks and groove tracks, and a physical address of the DVD-RAM is recorded in the header area. On the other hand, in the case of the DVD-R or the DVD-RW, the user data is recorded only in groove tracks and a physical address of the DVD-R or the DVD-RW is recorded in land tracks using prepits. The physical address recorded in the land tracks using the prepits is called Land Pre-Pit (LPP) data. The LPP data is formed during a mastering process and indicates a physical location of an optical medium corresponding to a location of a pickup when performing a recording or reproducing process on the optical medium.

Accordingly, it is required to precisely detect the LPP data during a recording or reproducing process of the optical drive.

SUMMARY OF THE INVENTION

Additional aspects and/or advantages of the invention will be set forth in part in the description which follows and, in part, will be obvious from the description, or may be learned by practice of the invention.

An aspect of the present invention provides an apparatus and method for precisely detecting Land Pre-Pit (LPP) data formed on an optical medium loaded into an optical drive.

An aspect of the present invention also provides an apparatus and method for precisely detecting LPP data by removing a wobble frequency from an optical signal reflected from an optical medium loaded into an optical drive.

According to an aspect of the present invention, an apparatus for detecting a Land Pre-Pit (LPP) data recorded on an optical medium loaded into an optical drive comprises an LPP data detecting unit that detects LPP data, from which a wobble frequency is removed, from a signal reflected from the optical medium; a wobble signal detector that detects a wobble signal from the reflected signal; and an LPP data generator that generates the LPP data recorded on the optical medium, using the detected LPP data and the detected wobble signal.

According to an aspect of the invention LPP data generator generates the detected LPP data, which is included in a section of the reflected signal where the wobble signal is detected by the wobble signal detector, as the LPP data recorded on the optical medium.

According to an aspect of the invention LPP data detector may comprise a band-stop filter that filters off the wobble frequency from the reflected signal; and an LPP detector that slices a signal output from the band-stop filter using a predetermined LPP slice level and detects the LPP data from which the wobble frequency is removed.

According to another aspect of the present invention, a method of detecting LPP data recorded on an optical medium loaded into an optical drive comprises removing a wobble frequency from a signal reflected from the optical medium; detecting LPP data from a signal from which the wobble frequency is removed, using a predetermined LPP slice level; detecting a wobble signal from the reflected signal using a predetermined wobble slice level; and generating LPP data recorded on the optical medium, using the detected wobble signal and the detected LPP data.

BRIEF DESCRIPTION OF THE DRAWINGS

The above and other aspects and/or advantages of the present invention will become more apparent by describing in detail exemplary embodiments thereof with reference to the accompanying drawings in which.

DETAILED DESCRIPTION OF THE EMBODIMENTS

Figure 1A:
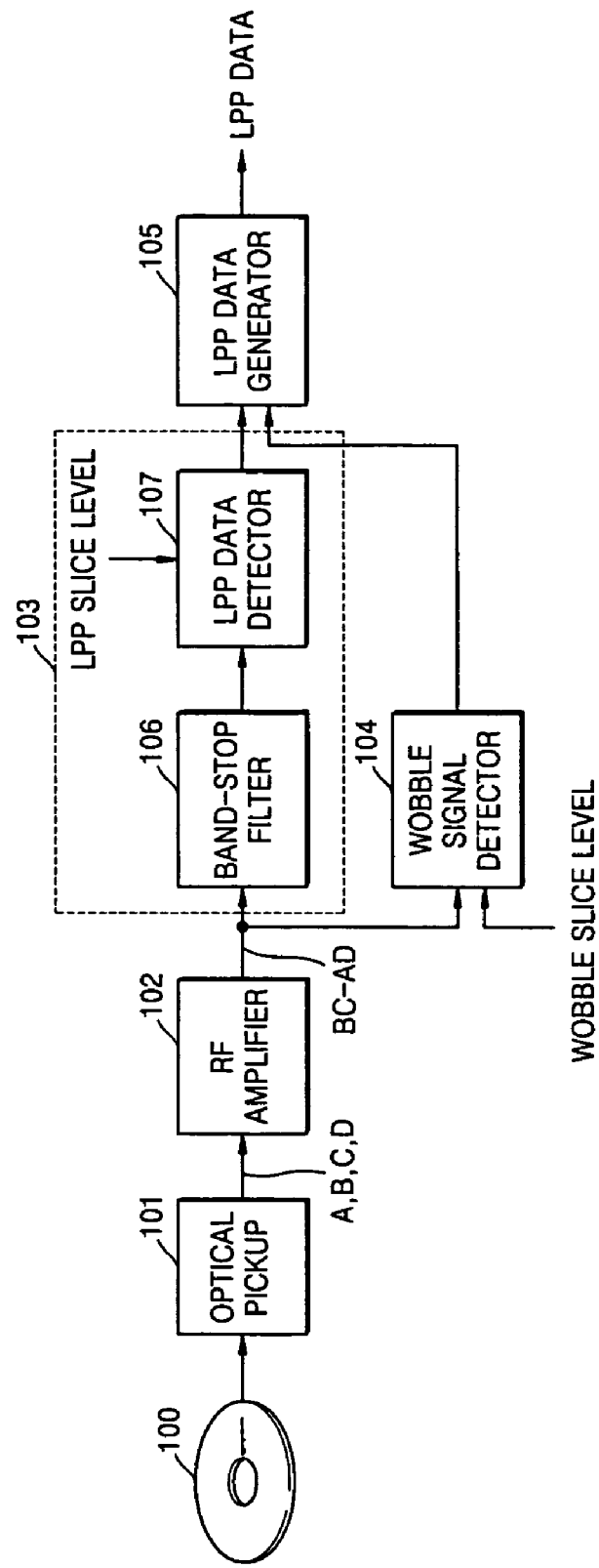
FIGS. 1A and 1B are block diagrams of an apparatus for detecting Land Pre-Pit (LPP) data according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1B:
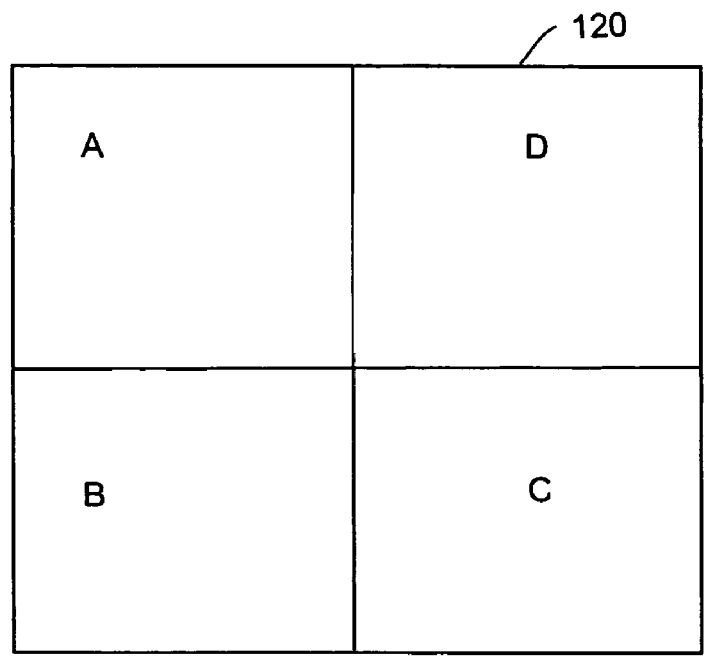
Figure 1B:
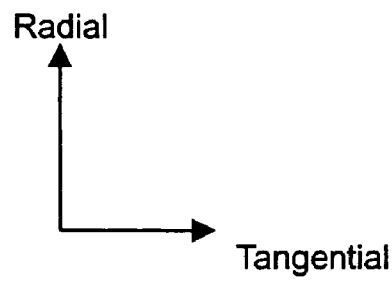

FIGS. 1A and 1B are block diagrams of an apparatus for detecting Land Pre-Pit (LPP) data according to an embodiment of the present invention. Referring to FIG. 1, the apparatus includes an optical medium 100, an optical pickup 101, a radio frequency (RF) amplifier 102, an LPP data detecting unit 103, a wobble signal detector 104, and an LPP data generator 105. A four part optical detector 120 is included in the optical pickup 101 and has detectors A, B, C, D, arranged in the radial and tangential directions of the optical medium 100, which receive the reflect light beam from the optical medium 100 and generate corresponding signals A, B, C, D. A controller (not shown) controls the operation of the optical pickup 101 using the wobble signal and the LPP data to transfer data with respect to the optical medium 100.

The optical medium 100 is a disc on which a wobble signal is recorded in tracks thereof. The tracks include land tracks and groove tracks. User data is recorded only in the groove tracks and information of physical locations of the tracks is recorded in the land tracks using prepits. The location information recorded in the land tracks is called LPP data. The LPP data is recorded during a mastering process and indicates a physical address of a portion of the optical medium 100 corresponding to a location of the optical pickup 101.

The optical pickup 101 receives an optical signal reflected from the optical medium 100, converts the received optical signal into electrical signals, and outputs the electrical signals. In FIG. 1, the optical pickup 101 outputs electrical signals A, B, C, and D. In this case, it is understood that the optical pickup 101 includes four optical receiving units. That is, a number of electrical signals output from the optical pickup 101 is determined by a number of optical receiving units therein. However, it is understood that other types, arrangements, and numbers of optical receiving units can be used.

The RF amplifier 102 amplifies the four electrical signals A, B, C, and D output from the optical pickup 101 to a predetermined level and detects a difference signal BC–AD among the amplified electrical signals A, B, C, and D. The LPP data detecting unit 103 detects LPP data, from which a wobble frequency is removed, from the difference signal BC–AD. For this operation, the LPP data detecting unit 103 includes a band-stop filter 106 and an LPP data detector 107.

The band-stop filter 106 filters off the wobble frequency from the difference signal BC–AD. The wobble frequency used by the band-stop filter 106 is 140.6 kHz. The difference signal BC–AD, output from the band-stop filter 106, from which the wobble frequency is removed is input to the LPP data detector 107. The LPP data detector 107 slices the difference signal BC–AD output from the band-stop filter 106 according to an LPP slice level, and detects the LPP data, from which the wobble frequency is removed, from the sliced difference signal BC–AD. In other words, the LPP data detector 107 outputs a signal whose level is higher than the LPP slice level as the LPP data from which the wobble frequency is removed. The LPP slice level is predetermined.

Figure 2A:
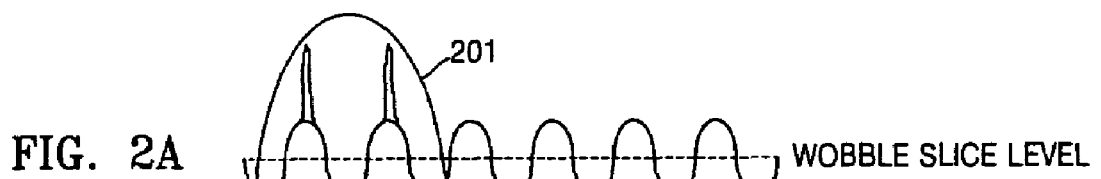
FIGS. 2A through 2E illustrate waveforms of signals output from elements of the apparatus of FIG. 1.
Figure 2B:
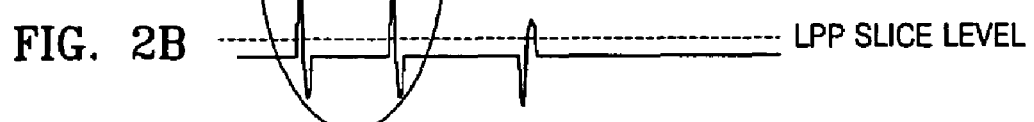
Figure 2C:

FIG. 2A illustrates a waveform of a signal output from the optical pickup 101 and a waveform of the difference signal BC–AD including the wobble frequency and the LPP data. FIG. 2B illustrates a waveform of a signal output from the band-stop filter 106 and a waveform of the difference signal BC–AD from which the wobble frequency is removed. FIG. 2C illustrates a waveform of a signal output from the LPP data detection 107 and a waveform of LPP data from which the wobble frequency is removed, the LPP data obtained by slicing the waveform of the difference signal BC–AD of FIG. 2B according to an LPP slice level shown in FIG. 2B.

Figure 2D:
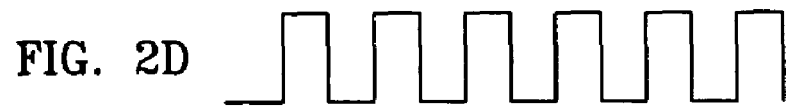

The wobble signal detector 104 detects a wobble signal from the difference signal BC–AD output from the RF amplifier 102, using a wobble slice level of FIG. 2A. The wobble slide level is predetermined in the shown embodiment, but can be otherwise determined or set, such as using read data. The wobble signal corresponding to the difference signal BC–AD of FIG. 2A is detected as shown in FIG. 2D.

The LPP data generator 105 generates LPP data for the optical medium 100, using the LPP data, output from the LPP data detecting unit 103, from which the wobble frequency is removed and the wobble signal output from the wobble signal detector 104.

Figure 2E:

That is, when the LPP data detected by the LPP data detector 107 is included in a section of the wobble signal detected by the wobble signal detector 104, the LPP data generator 105 generates the detected LPP data as the LPP data of the optical medium 100. Thus, if the wobble signal is detected as shown in FIG. 2D and the LPP data from which the wobble frequency is removed is detected as shown in FIG. 2C, the LPP data generator 105 generates the LPP data as shown in FIG. 2E.

Figure 3:
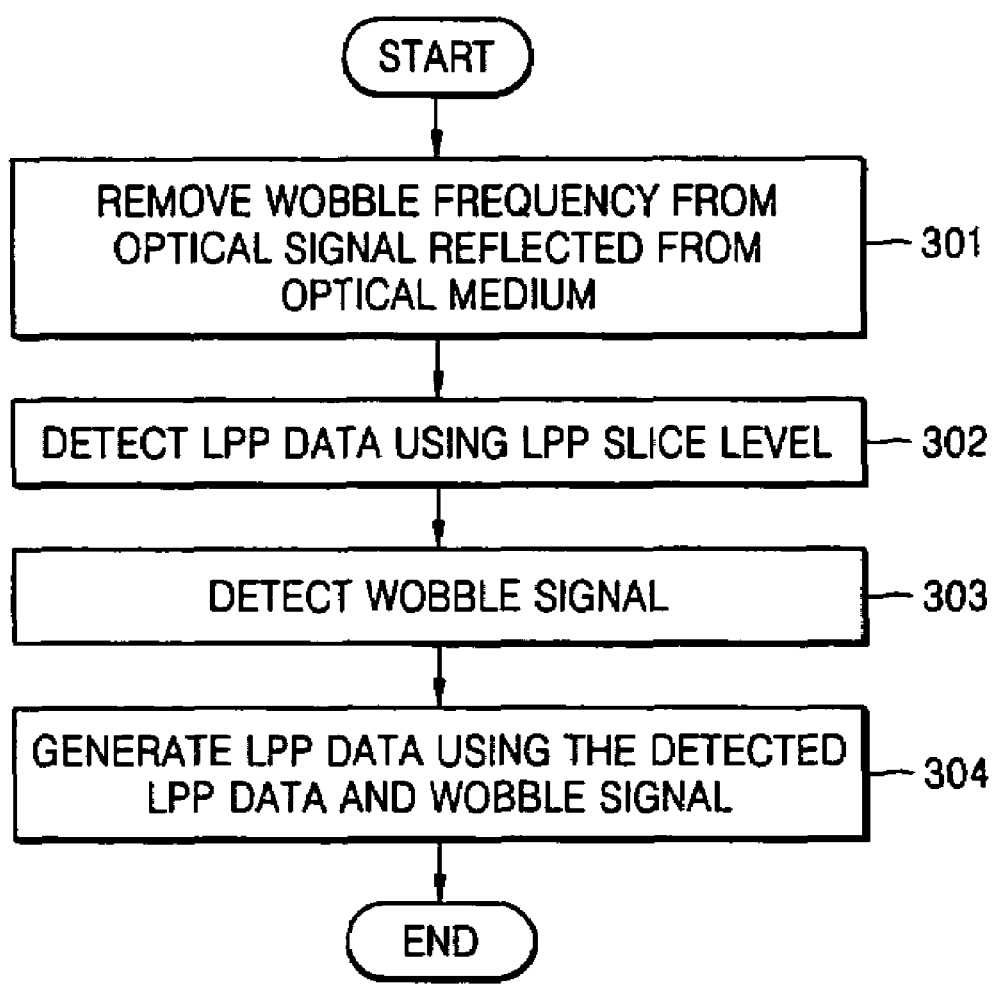
FIG. 3 is a flowchart illustrating a method of detecting LPP data, according to an embodiment of the present invention.

FIG. 3 is a flowchart illustrating a method of detecting LPP data, according to an embodiment of the present invention. Referring to FIG. 3, a wobble frequency is removed from an optical signal reflected from the optical medium 100 (in step 301). That is, band-stop filtering is performed on the optical signal to remove a wobble frequency contained in the optical signal according to an aspect of the invention.

In step 302, the LPP data is detected from the optical signal from which the wobble frequency is removed, using a predetermined LPP slice level. In other words, if a level of the optical signal from which the wobble frequency is removed is higher than the LPP slice level, the optical signal is detected as the LPP data according to an aspect of the invention.

In step 303, a wobble signal is detected from the reflected optical signal using the wobble slice level. That is, the wobble signal is detected as shown in FIG. 2D for the reflected optical signal as shown in FIG. 2A.

The LPP data of the optical medium 100 is generated using the detected wobble signal and LPP data (in step 304). More specifically, the detected LPP data included in a section of the detected wobble signal is generated as the LPP data of the optical medium 100. The detected LPP data included in the sections other than the sections of the detected wobble signal is not generated as the LPP data of the optical medium 100.

As described above, according to an aspect of the present invention, only the LPP data contained in an available section of the optical signal reflected from an optical medium is detected as the LPP data of an optical medium, using LPP data from which a wobble frequency is removed and a wobble signal. Thus, if the wobble signal is detected as shown in FIG. 2D and the LPP data from which the wobble frequency is removed is detected as shown in FIG. 2C, the LPP data generator 105 generates the LPP data as shown in FIG. 2E. Therefore, it is possible to precisely detect LPP data from the optical medium. Here, the available sections are sections where the wobble signal included in the reflected optical signal is detected.

While described in terms of a DVD, it is understood that the apparatus and method of the present invention can be used with optical media.

While the present invention has been particularly shown and described with reference to embodiments thereof, it will be understood by those skilled in the art that various changes in form and details may be made therein without departing from the spirit and scope of the invention as defined by the appended claims and equivalents.

What is claimed is:

1. An apparatus for detecting original land pre-pit (LPP) data recorded on an optical medium loaded into an optical drive, the apparatus comprising:

an LPP data detecting unit that detects read LPP data, from which a wobble frequency is removed, from a signal reflected from the optical medium, the LPP data detecting unit filtering off the wobble frequency from a difference signal generated from the signal reflected from the optical medium;

a wobble signal detector that detects a wobble signal from the reflected signal; and an LPP data generator that outputs the original LPP data recorded on the optical medium, using the detected read LPP data and the detected wobble signal.

2. The apparatus of claim 1, wherein the LPP data generator outputs the detected read LPP data, which is included in a section of the reflected signal where the wobble signal is detected by the wobble signal detector, as the original LPP data recorded on the optical medium.

3. An apparatus for detecting original land pre-pit (LPP) data recorded on an optical medium loaded into an optical drive, the apparatus comprising:

an LPP data detecting unit that detects read LPP data, from which a wobble frequency is removed, from a signal reflected from the optical medium;

a wobble signal detector that detects a wobble signal from the reflected signal; and an LPP data generator that outputs the original LPP data recorded on the optical medium, using the detected read LPP data and the detected wobble signal, wherein the LPP data detector comprises:
a band-stop filter that filters out the wobble frequency from the reflected signal; and
an LPP detector that slices a signal output from the band-stop filter using a predetermined LPP slice level, and detects the read LPP data from which the wobble frequency is removed.

4. The apparatus of claim 3, wherein the wobble signal detector detects the wobble signal by slicing the reflected optical signal using a predetermined wobble slice level.

5. The apparatus of claim 3, wherein the wobble frequency is 140.6 KHZ.

6. A method of detecting original land pre-pit (LPP) data recorded on an optical medium loaded into an optical drive, the method comprising:
filtering off a wobble frequency from a difference signal generated from a signal reflected from the optical medium and removing the wobble frequency from the signal reflected from the optical medium;
detecting read LPP data from the signal from which the wobble frequency is removed, using a predetermined LPP slice level;
detecting a wobble signal from the reflected signal using a predetermined wobble slice level; and
generating the original LPP data recorded on the optical medium, using the detected wobble signal and the detected read LPP data.

7. A method of detecting original land pre-pit (LPP) data recorded on an optical medium loaded into an optical drive, the method comprising:
removing a wobble frequency from a signal reflected from the optical medium;
detecting read LPP data from the signal from which the wobble frequency is removed, using a predetermined LPP slice level;
detecting a wobble signal from the reflected signal using a predetermined wobble slice level; and
generating the original LPP data recorded on the optical medium, using the detected wobble signal and the detected read LPP data, wherein, when removing the wobble frequency, band-stop filtering is performed to filter out the wobble frequency from the reflected optical signal.

8. The method of claim 7, wherein when generating the original LPP data recorded on the optical medium, the detected read LPP data included in a section where the wobble signal is detected is generated as the original LPP data recorded on the optical medium.

9. The method of claim 7, wherein the wobble frequency is 140.6 KHZ.

10. A method of generating a land pre-pit (LPP) data recorded on a data medium loaded into a drive, comprising:
detecting a wobble signal; and
filtering off the wobble signal from a difference signal generated from a signal received from the data medium and generating the LPP data if the wobble signal is detected, and not generating the LPP data if the wobble signal is not detected.

11. A DVD player having the apparatus of claim 3.

12. A recording and/or reproducing apparatus having the apparatus of claim 3.

13. An apparatus for generating a land pre-pit (LPP) data recorded on a data medium loaded into a drive, comprising:
a wobble signal detector to detect a wobble signal, and
an LPP data generator filtering off the wobble signal from a difference signal generated from a signal received from the data medium and generating the LPP data if a wobble signal is detected from the wobble signal detector, and not generating the LPP data if the wobble signal is not detected from the wobble signal detector.

14. The apparatus of claim 1, wherein the signal reflected from the optical medium is converted into at least four electrical signals and the difference signal is generated by subtracting a combination of at least two of the electrical signals from a combination of at least two different ones of the electrical signals.

15. The apparatus of claim 1, wherein the signal reflected from the optical medium is converted into four electrical signals A, B, C and D, and the difference signal is achieved by subtracting BC from AD (BC–AD).

* * * * *

UNITED STATES PATENT AND TRADEMARK OFFICE
CERTIFICATE OF CORRECTION

| | | |
|---|---|---|
| PATENT NO. | : 7,440,367 B2 | Page 1 of 1 |
| APPLICATION NO. | : 10/921302 | |
| DATED | : October 21, 2008 | |
| INVENTOR(S) | : Hong-young Jung et al. | |

It is certified that error appears in the above-identified patent and that said Letters Patent is hereby corrected as shown below:

Title Page, Item (57) (Abstract), Line 1, after "method" change "has a capable" to --have capabilities--.

Signed and Sealed this

Tenth Day of February, 2009

JOHN DOLL
*Acting Director of the United States Patent and Trademark Office*